United States Patent [19]
Kim

[11] Patent Number: 5,534,920
[45] Date of Patent: Jul. 9, 1996

[54] VIEWFINDER BRIGHTNESS CONTROL CIRCUIT FOR A CAMCORDER EMPLOYING IRIS OUTPUT VOLTAGE AND METHOD THEREFOR

[75] Inventor: No-jin Kim, Suwon-city, Rep. of Korea

[73] Assignee: Samsung Electronics Co., Ltd., Kyungki-Do, Rep. of Korea

[21] Appl. No.: 273,126

[22] Filed: Jul. 14, 1994

[30] Foreign Application Priority Data

Jul. 14, 1993 [KR] Rep. of Korea ............... 93-13194

[51] Int. Cl.⁶ .................................................. H04N 5/222
[52] U.S. Cl. .................................... 348/333; 348/363
[58] Field of Search ........................... 348/207, 362, 348/363, 378, 386, 389, 390, 398, 602, 603, 687, 333, 334; 354/219, 270, 220, 222, 223; H04N 9/30, 5/30

[56] References Cited

U.S. PATENT DOCUMENTS

| | | | |
|---|---|---|---|
| 4,355,334 | 1/1982 | Fitzgibbon et al. | 348/602 |
| 4,589,022 | 5/1986 | Prince et al. | 348/602 |
| 4,649,431 | 3/1987 | Terashi | 348/363 |
| 5,270,818 | 12/1993 | Ottenstein | 348/602 |
| 5,282,075 | 1/1994 | Sugimori | 348/363 |

*Primary Examiner*—Wendy Greening
*Assistant Examiner*—Tuan V. Ho
*Attorney, Agent, or Firm*—Sughrue, Mion, Zinn, Macpeak & Seas

[57] ABSTRACT

A camcorder viewfinder brightness control circuit includes a first amplifier for amplifying a video signal corresponding to an object to a predetermined level, a second amplifier for detecting a change in an iris output voltage which varies in response to variations in ambient brightness and amplifying the iris output voltage by a predetermined ratio, and a light controller for automatically controlling the brightness of an image supplied to the viewfinder responsive to the change in ambient brightness. Preferably, the light controller adds the signal representing change in the iris output voltage output by the second amplifier to the video signal output from the first amplifier. A method for controlling a camcorder viewfinder brightness control circuit is also described.

5 Claims, 2 Drawing Sheets

VIEWFINDER BRIGHTNESS CONTROL CIRCUIT FOR A CAMCORDER EMPLOYING IRIS OUTPUT VOLTAGE AND METHOD THEREFOR

BACKGROUND OF THE INVENTION

1. Field of the Invention

The present invention relates to a viewfinder brightness control circuit for a camcorder. More specifically, the present invention relates to a circuit which automatically controls the brightness of the image produced by an electronic viewfinder by applying an iris output voltage, which voltage varies in response to the sensed illumination of the environment.

2. Discussion of Related Art

When an object is photographed by a camcorder, the image quality produced by the electronic viewfinder is greatly affected by the illumination, i.e., the brightness of the surrounding. Accordingly, when an object is photographed by the camcorder, the viewfinder needs to be adjusted to compensate for the ambient illumination so that the image quality at the viewfinder is acceptable.

As shown in FIG. 3, a camcorder 100 includes a lens group 102 directing light through an iris 104 to a target 108. It will be appreciated that target 108 can be, e.g., a charge-coupled device (CCD) or similar device. Signals produced by target 108 are provided to a video signal processor 112 via a preamp 110. An indication of the brightness level at the target is provided from processor 112 to an iris motor 106, which is connected to iris 104, via an amplifier 114. Additionally, the video signal produced by video signal processor 112 is provided to an electronic viewfinder (EVF) 118 via control circuitry 116. In an exemplary case, the control circuitry included in block 116 is as shown in FIG. 1.

In general, brightness at the viewfinder is designed to be manually controlled. As shown in FIG. 1, a conventional viewfinder brightness control circuit includes an amplifier 1 and a light controller 3.

Amplifier 1 includes a PNP transistor Q1 whose base is connected to a video signal input terminal via capacitor C1, whose emitter is grounded via a resistor R4, and whose collector is connected to a power voltage (Vcc) input terminal via a resistor R3; a resistor R1 connected between the power voltage input terminal and the base of PNP transistor Q1; a resistor R2 connected between the base of PNP transistor Q1 and ground; and a capacitor C2 having one terminal connected to the collector of PNP transistor Q1 and the other terminal connected to EVF 118 via light controller 3.

Light controller 3 includes a resistor R5 connected between the other terminal of capacitor C2 (hereinafter node A) and the power voltage input terminal, a variable resistance VR1 and a resistor R6 connected to ground via the common node of capacitor C2 and resistor R5, and a capacitor C3 connected between the wiper of variable resistor VR1 and ground. It will be noted that the wiper of variable resistor VR1 is also connected to node A between capacitor C2 and resistor R5.

Voltage at node A varies depending on variable resistor VR1 in light controller 3 and the video signal level output to the EVF 118 is determined in accordance with the variation in node A voltage. Thus, electronic viewfinder brightness is controlled by a video signal level output to EVF 118. In other words, if the viewfinder is located in well illuminated area, the voltage level of the video signal output to the electronic viewfinder will be high. When the electronic viewfinder is located in a poorly illuminated area, the voltage level of a video signal output to a viewfinder will be low. Accordingly, viewfinder brightness can be adjusted by controlling the resistance value of variable resistor VR1. It will be noted that the resistance value has to be selected in response to voltage level corresponding to the brightness level such that the voltage level is controlled after the user confirms the viewfinder brightness.

As described above, in the conventional operating method, the user directly controls variable resistor VR1 attached to the camcorder in order to control electronic viewfinder brightness. When the user operates the camcorder without manually adjusting the variable resistor, e.g., if the user depends on a preset brightness value stored in the camcorder, or when brightness is controlled after a video signal is displayed on the electronic viewfinder, the resolution of a viewfinder image quality can be deteriorated. This is a source of great inconvenience to a camcorder user.

SUMMARY OF THE INVENTION

The principal object of the present invention is to provide a viewfinder brightness control circuit for automatically controlling viewfinder brightness by applying an iris output voltage indicative of ambient brightness to a video signal output by a camcorder.

This and other objects, features and advantages according to the present invention are provided by a camcorder viewfinder brightness control circuit. The circuit advantageously includes a first amplifier for amplifying a video signal representing an object to a predetermined level, a second amplifier for detecting the change in an iris output voltage, Which voltage varies depending on ambient brightness, so as to amplify the iris output voltage to a predetermined level, and a light controller for automatically controlling the brightness of the viewfinder according to the ambient brightness by combining the output signals of the first and second amplifiers with one another. According to one aspect of the invention, the signal applied to the viewfinder is formed by adding a differential voltage representative of a change in the iris output voltage output from the second amplifier to the amplified video signal output from the first amplifier.

BRIEF DESCRIPTION OF THE DRAWINGS

The above objects and advantages of the present invention will become more apparent by describing in detail a preferred embodiment thereof with reference to the attached drawings in which like elements are denoted by like or similar numbers and in which.

DETAILED DESCRIPTION OF THE PREFERRED EMBODIMENT

Figure 2:
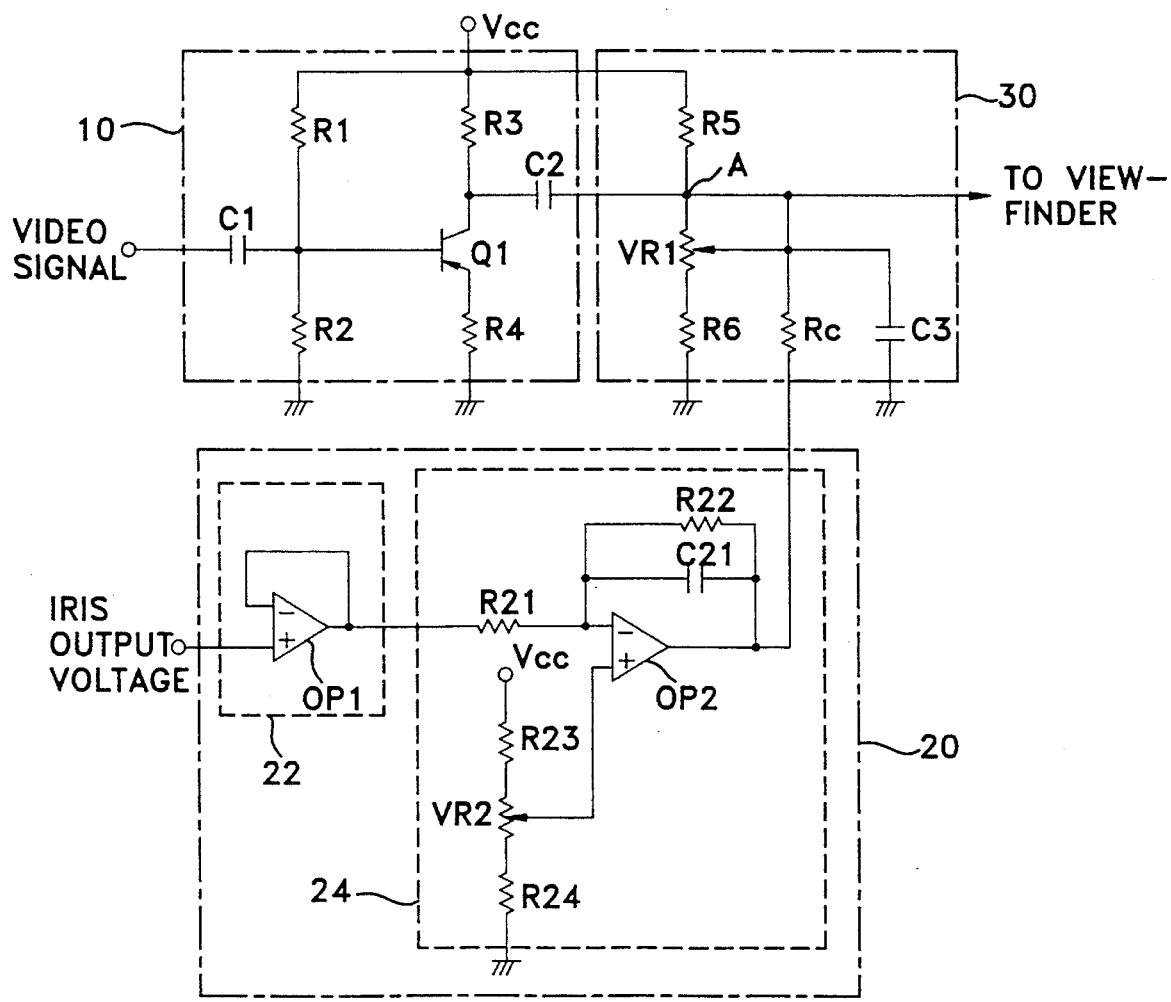
FIG. 2 illustrates an embodiment of a viewfinder brightness control circuit of a camcorder according to the present invention.

A preferred embodiment according to present invention will be explained in more detail with particular reference to the attached drawings, wherein FIG. 2 is a viewfinder brightness control circuit. The brightness control circuit of FIG. 2 includes a first amplifier 10, a second amplifier 20 and a brightness controller 30.

Figure 1:
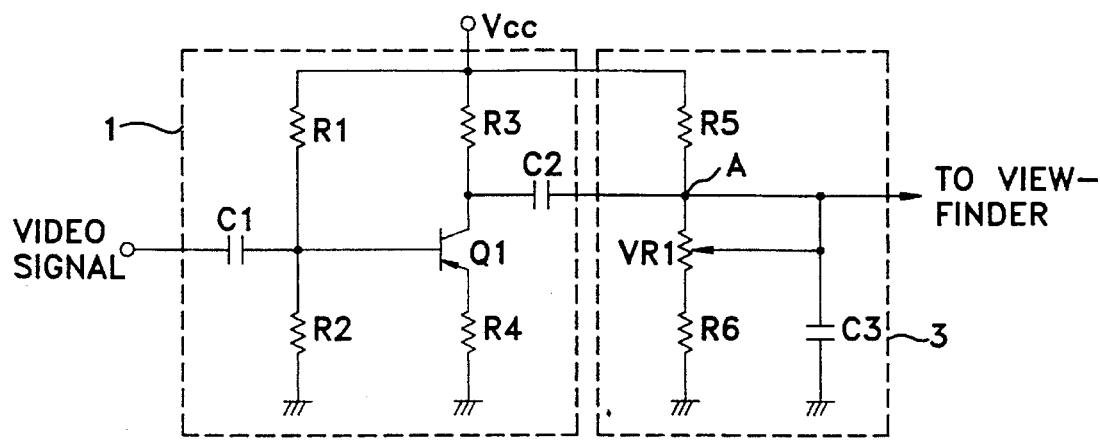
FIG. 1 illustrates a conventional viewfinder brightness control circuit.

It will be noted that the first amplifier 10 of FIG. 2 is substantially the same as the amplifier 1 shown in FIG. 1, i.e., elements C1', C2', R1', R2', R3', R4' and Q1' in first amplifier 10 are substantially similar to comparable elements in amplifier 1. Therefore, a detailed explanation as to the construction and operation of amplifier 10 will be omitted in the interest of brevity. It will also be noted that the light controller 30 is structurally similarly to light controller 3 of FIG. 1, with the exception that a resistor Rc is advantageously provided and operatively connected between the wiper of variable resistor VR1 and the output of second amplifier 20.

Second amplifier 20 preferably includes a delta detector 22 and voltage controller 24. Delta detector 22 can be advantageously constructed from a first operational amplifier OP1 whose non-inverting input receives an iris output voltage and whose output is fed back to the inverting input of OP1. In addition, voltage controller 24 preferably includes a second operational amplifier OP2 having a resistor R23, variable resistor VR2 and resistor R24 connected in series between the power voltage and ground, whose non-inverting input is connected to the wiper of variable resistor VR2 and whose inverting input is connected to the output of delta detector 22 via resistor R21; and a resistor R22 and capacitor C21 connected in parallel between the output of second operational amplifier OP2 and its inverting input. The output of second operational amplifier OP2 is connected to resistor Rc of light controller 30.

Advantageously, in the viewfinder brightness control circuit for a camcorder described above, first amplifier 10 operates in essentially the same manner as that of amplifier 1 of FIG. 1. Thus, a detailed operational description will be omitted so as to focus on the operation of second amplifier 20 and light controller 30, which will be explained immediately below.

Figure 3:
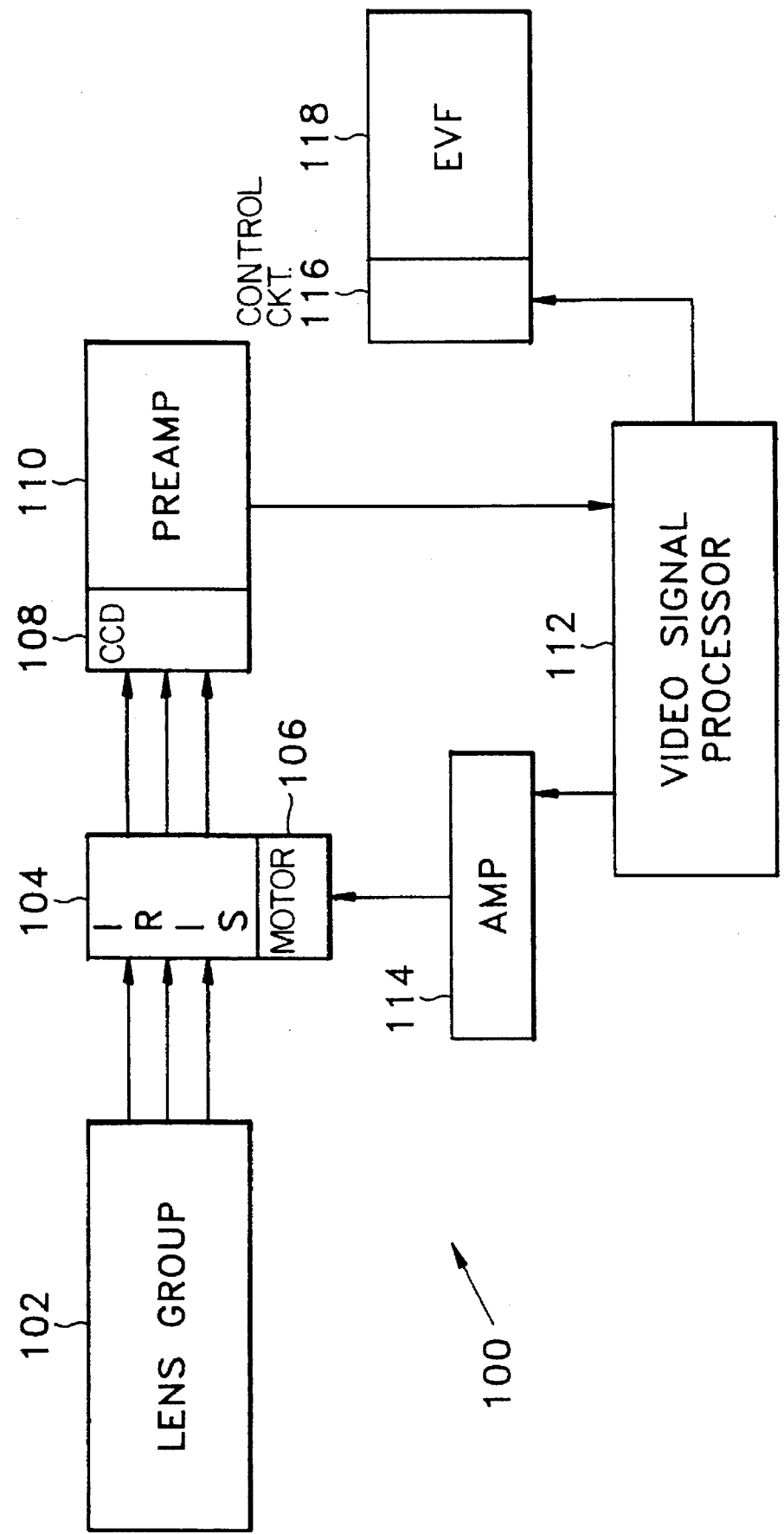
FIG. 3 is a high level block diagram of selected portions of a camcorder which are useful in explaining the operation of an electronic viewfinder both in relation to the conventional viewfinder control circuit of FIG. 1 and the preferred embodiment of viewfinder brightness control circuit according to the present invention shown in FIG. 2.

An iris output voltage generated by a sensor associated with a lens, e.g., lens group 102 in FIG. 3, is input to delta detector 22. First operational amplifier OP1 of delta detector 22 compares an iris output voltage generated by amplifier 114 in FIG. 3 and applied to its non-inverting input with the feedback voltage applied to its inverting input, so as to amplify the amount of change in the iris output voltage. The amplified difference in iris output voltage can be advantageously applied to voltage controller 24. It will be appreciated that the amplified difference in iris output voltage varies in response to on brightness sensed through the lens.

Voltage controller 24 controls the signal level of the amplified difference in iris output voltage applied to light controller 30 based of the ratio determined with respect to the values of resistor R21 and resistor R22. Preferably, an amount of change in iris output voltage is generated by second amplifier 20 and applied to light controller 30. In an exemplary case, the output of second amplifier 20 is added to an amplified video signal received from first amplifier 10 via resistor Rc included in light controller 30.

It will be appreciated that the change in iris output voltage applied to resistor Rc varies depending on the brightness of the light sensed through the lens group 102. For example, an iris voltage is output such that the lens iris 104 can be closed when a strong light enters lens group 102 and can be opened to accommodate darker environments. It will be noted that this example addresses the case wherein the lens iris 104 is automatically opened and closed in response to the iris output voltage applied, in an exemplary case, to iris motor 106. It will also be appreciated from the description immediately above that the viewfinder brightness for a camcorder can be automatically controlled in a similar manner.

It will also be noted that, as described above, in order to automatically control a viewfinder brightness for a camcorder using an iris signal whose voltage level varies in proportion to light intensity, an iris output voltage that varies depending on ambient illumination, i.e., strength of the incident light, can advantageously be added to an amplified video signal via, in an exemplary case, resistor Rc. When the surrounding is bright, the iris output voltage for lowering the video signal level applied to the viewfinder is added to the video signal via resistor Rc. For darker environments, the iris output voltage for increasing the video signal level is added to the video signal via resistor Rc.

Thus, the iris output voltage, whose level varies depending on ambient brightness, is advantageously added to the video signal via resistor Rc so as to control the video signal level applied to the viewfinder. It will be appreciated that the video signal whose level is controlled according to brightness is input to a viewfinder, to thereby automatically control the brightness of images provided to the viewfinder.

In a viewfinder brightness control circuit for a camcorder according to the present invention, the iris output voltage whose level varies depending on ambient brightness is added to the input video signal. Thus, viewfinder brightness can be controlled automatically in response to changes in the surrounding illumination. It will be appreciated that user convenience in such a camcorder is markedly enhanced.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A camcorder viewfinder brightness control circuit, comprising:
    a first amplifier for amplifying a video signal representing an object to a predetermined level to thereby generate an amplified video signal;
    a second amplifier for detecting a change in an iris output voltage, which voltage varies in response to a respective change in ambient brightness, and amplifying said change in iris output voltage by a predetermined ratio to thereby produce an amplified differential voltage; and
    a light controller adding said amplified differential voltage generated by said second amplifier to said amplified video signal output from said first amplifier so as to permit automatic control of brightness of an object image provided by viewfinder in response to said change in said ambient brightness.

2. A method for operating a camcorder viewfinder brightness control circuit having a first amplifier for amplifying a video signal representing an object to a predetermined level to thereby produce an amplified video signal, and a second amplifier for detecting a change in an iris output voltage, which voltage varies in response to ambient brightness, and amplifying said change in said iris output voltage by a predetermined ratio to thereby produce an amplified differential voltage, said method comprising the steps of:
    (a) generating said amplified video signal and said amplified differential voltage; and (b) offsetting said amplified video signal in response to said amplified differential voltage.

3. The method according to claim 2, wherein said step (a) further comprises the steps of:

(c) determining said change in said iris output voltage to thereby generate a differential voltage;

(d) amplifying said differential voltage to thereby produce said amplified differential voltage;

and wherein said step (b) comprises the step of:

(e) adding said amplified differential voltage to said amplified video signal.

4. A camcorder viewfinder brightness control circuit, comprising:

first amplifier means for amplifying a video signal representing an object by a predetermined ratio to thereby generate an amplified video signal;

second amplifier means generating an amplified differential voltage in response to a change in an iris output voltage indicative of a respective change in ambient brightness; and control means for adding said amplified differential voltage to said amplified video signal to thereby provide automatic control of brightness of an object image provided by a viewfinder in response to said change in said ambient brightness.

5. The camcorder viewfinder brightness control circuit as recited in claim 4, wherein said second amplifier means comprises:

differential means receiving said iris output voltage for generating a differential voltage; and voltage control means receiving said differential voltage for generating said amplified differential voltage at a predetermined level provided to said control means.

* * * * *